(12) United States Patent
Reischmann et al.

(10) Patent No.: US 12,239,258 B2
(45) Date of Patent: Mar. 4, 2025

(54) DC COOKING APPLIANCE

(71) Applicant: Kenyon International, Inc., Clinton, CT (US)

(72) Inventors: Michael Reischmann, Eustis, FL (US); Phillip Williams, Clinton, CT (US)

(73) Assignee: Kenyon International, Inc., Clinton, CT (US)

( * ) Notice: Subject to any disclaimer, the term of this patent is extended or adjusted under 35 U.S.C. 154(b) by 0 days.

(21) Appl. No.: 18/496,536

(22) Filed: Oct. 27, 2023

(65) Prior Publication Data

US 2024/0049911 A1 Feb. 15, 2024

Related U.S. Application Data

(63) Continuation of application No. 17/896,997, filed on Aug. 26, 2022, now Pat. No. 11,825,987, which is a continuation of application No. 17/682,760, filed on Feb. 28, 2022, now Pat. No. 11,659,629.

(60) Provisional application No. 63/162,857, filed on Mar. 18, 2021.

(51) Int. Cl.
*A47J 37/07* (2006.01)
*H05B 1/02* (2006.01)
*H05B 6/06* (2006.01)

(52) U.S. Cl.
CPC ........ *A47J 37/0709* (2013.01); *H05B 1/0266* (2013.01); *H05B 6/062* (2013.01)

(58) Field of Classification Search
CPC .... H05B 1/0266; H05B 6/062; A47J 37/0629; A47J 37/0709
See application file for complete search history.

(56) References Cited

U.S. PATENT DOCUMENTS

| | | | |
|---|---|---|---|
| 3,692,975 A * | 9/1972 | Markus | H02J 7/1438 |
| | | | 219/202 |
| 4,502,461 A | 3/1985 | Keating | |
| 6,037,571 A | 3/2000 | Christopher | |
| 6,369,366 B1 | 4/2002 | Mullen | |
| 10,349,776 B2 | 7/2019 | Reischmann et al. | |
| 2011/0220636 A1* | 9/2011 | Hendricks | H05B 1/0252 |
| | | | 219/494 |
| 2012/0321760 A1 | 12/2012 | Xie | |

(Continued)

FOREIGN PATENT DOCUMENTS

| CA | 2292674 A1 | 6/2001 |
|---|---|---|
| CN | 201442534 U | 4/2010 |

(Continued)

OTHER PUBLICATIONS

International Search Report for Application # PCT/US22/20535 dated Jul. 12, 2022.

*Primary Examiner* — Thien S Tran
(74) *Attorney, Agent, or Firm* — Farber LLC; Jonathan Winter

(57) ABSTRACT

A DC powered cooking appliance which uses an induction or a resistance based DC heating element and excludes AC powered heating elements and preferably does not rely on directly connected combustion powered heating elements. Some embodiments include wattage of 1500 watts or less, voltages of 40 or 48 volts or more and are installed on a boat, van, rv or bus such that an inverter of that boat, van, rv or bus is not electrically connected to the cooking appliance.

27 Claims, 6 Drawing Sheets

(56) References Cited

U.S. PATENT DOCUMENTS

| | | | |
|---|---|---|---|
| 2014/0305927 A1 | 10/2014 | Alexander | |
| 2017/0223780 A1* | 8/2017 | Heo | H05B 6/1209 |
| 2018/0177000 A1* | 6/2018 | Son | H05B 6/062 |
| 2020/0084837 A1 | 3/2020 | Knappenberger | |
| 2020/0085225 A1 | 3/2020 | Kim et al. | |
| 2020/0100622 A1* | 4/2020 | Collins | H01M 10/655 |
| 2020/0396797 A1 | 12/2020 | Tan et al. | |

FOREIGN PATENT DOCUMENTS

| | | | | |
|---|---|---|---|---|
| CN | 203399970 U | | 1/2014 | |
| CN | 207122930 U | * | 3/2018 | |
| CN | 209789487 U | | 12/2019 | |
| CN | 106879096 B | * | 9/2023 | H05B 6/062 |
| KR | 200260521 Y1 | * | 1/2002 | |

\* cited by examiner

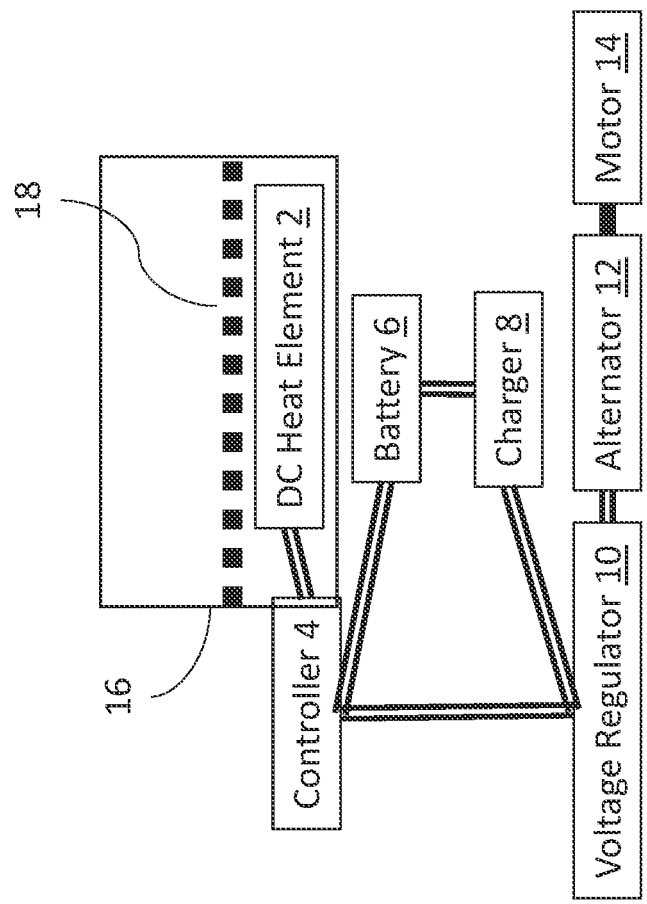
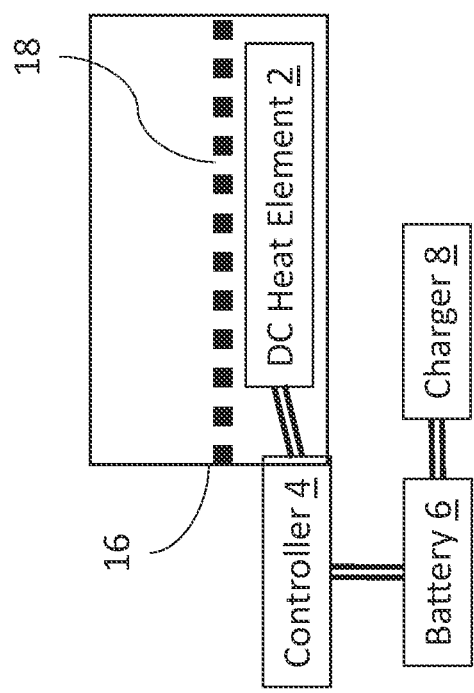
FIG. 1B
FIG. 1A

DC COOKING APPLIANCE

FIELD OF THE INVENTION

The following relates to a cooking appliance, more particularly a direct current (DC) cooking appliance such as a grill, cooktop, hot plate and the like.

BACKGROUND OF THE INVENTION

Electric cooking appliances come in many shapes, sizes and types, but since cooking often requires a large amount of heat and thus wattage, DC has typically been seen as an undesirable power source as it often requires too high of an amperage to obtain acceptable heating. Alternating current (AC) has been more prevalent, typically because homes are powered by AC and because the current requirements are much lower since the voltage is typically higher in AC as opposed to DC.

However, AC cooking appliances become a burden in certain situations where AC is not the primary power source available. For example, marine vessels often will have an alternator to supply power off the engine and this will often come out as DC power. To power currently available AC cooking appliances in a marine vessel kitchen requires an inverter to convert the DC to AC.

Some combined AC and DC grills have been theorized such as Canadian Patent 2,292,674 which describes the combined use of both DC and AC power in that a battery is supplied which charges when the cooking appliance is off and then when turned on, the AC power supplies the first 1800 watts and the DC battery and heating element supplies additional wattage to obtain a combined power rating above 1800 watts without drawing more than 15 amps. The primary goal of that invention is to use DC to obtain extra heating, not to be the primary (and only) heat source.

SUMMARY OF THE INVENTION

Therefore, it is an object of the present invention to provide a cooking appliance which uses DC powered heating elements as its primary heat source, without use of AC heating elements, preferably a DC only powered grill.

It is further an object of the present invention to provide a DC powered cooking appliance which is suitable for marine vessels, RVs, off-grid structures and other locations to avoid/eliminate the need for an inverter or DC to AC converter.

It is further an object of the present invention to provide a DC cooking appliance which can be powered by high voltage DC batteries.

These and other objects are achieved by providing a cooking appliance comprising a controller and a direct current (DC) powered heating element wherein the controller and heating element are configured to connect to a source of DC electrical potential. Activation of the DC powered heating element by the controller is configured to heat a cooking surface which is configured to be located adjacent the DC powered heating element to heat the cooking surface. The cooking appliance excludes an alternating current (AC) powered heating element and excludes a combustion heating element.

In certain aspects the heating element is an induction DC powered heating element and further comprising a support configured to support a cooking vessel comprising the cooking surface and activation of the DC powered heating element by the controller heats the cooking surface. In other aspects the heating element is a resistance DC powered heating element. In other aspects the cooking appliance is configured to operate at 1500 watts or less. In still other aspects the DC powered heating element is connected to a source of DC potential of 30 volts or more 35 volts or more or more preferably 40 volts or more. In still other aspects the cooking appliance is configured to operate without actively drawing power from a combustion activated DC power source.

In still other aspects a vehicle includes the cooking appliance installed on or in the vehicle. In still other aspects the vehicle is battery powered electric vehicle and the cooking appliance is connected to a battery of the vehicle. In yet other aspects the battery of the vehicle further powers one or more electric motors which cause the vehicle to move and the vehicle is a land, sea or air vehicle. In still other aspects the cooking appliance has a wattage rating of 2000 W or less. In still other aspects the source of DC electrical potential is selected from the group consisting of: a battery, a solar panel, a wind powered generator. In yet other aspects the source of DC electrical potential is configured to power the cooking appliance when the source of DC electrical potential does not receive power from an AC power source.

In yet other aspects the cooking appliance draws less than 40 amps or less than 30 amps at a maximum power setting of the controller. In still other aspects the cooking surface is a grill or griddle and wherein at a maximum power setting of the controller, the cooking appliance draws less than 40 amps and generates heat sufficient to raise a temperature of the grill surface to 500 deg within 10 minutes with a grill lid closed and the cooking appliance positioned in a 70 deg F. environment. In still other aspects the cooking appliance has a wattage rating of 1600 W or less or 1400 W or less.

In still other aspects the appliance includes a device which steps down voltage positioned electrically between the controller and the source of DC electrical potential such that the controller and the heating element operate at different voltages with the controller operating at a lower DC voltage than the heating element. In still other aspects the heating element operates at a voltage which is at least 7 times the voltage of the controller.

Other objects are achieved by a cooking appliance having a controller and a direct current (DC) powered heating element wherein the controller and heating element are configured to connect to a source of DC electrical potential. Activation of the DC powered heating element by the controller heats a cooking surface configured to be located adjacent the DC powered heating element. The cooking appliance excludes an alternating current (AC) powered heating element.

In other aspects the source of DC electrical potential is connected without an inverter or other DC to AC conversion device positioned electrically between the source of DC electrical potential and the DC powered heating element.

In still other aspects, a cooking appliance is provided with a heating element and a controller electrically connected to the heating element. The controller includes a conversion device which modifies power output, wherein the controller is configured to connect directly to a source of DC electrical potential to modify power output to the heating element. Activation of the heating element by the controller is configured to heat a cooking surface which is configured to be located adjacent the heating element heats the cooking surface. The cooking appliance excludes a combustion heating element.

In certain aspects the controller is a pulse width modulation (PWM) controller. In other aspects the PWM controller converts the DC input to a waveform of varied pulse widths of both positive and negative voltage to the heating element.

In other aspects a vehicle with a cooking appliance is provided. The vehicle has a source of DC electrical potential. The cooking appliance has a heating element; and a controller electrically connected to the heating element, the controller controlling power output to the heating element; wherein activation of the heating element by the controller is configured to draw electricity from the source of DC electrical potential to generate heat; wherein the cooking appliance excludes a combustion heating element. The cooking appliance is connected to the source of DC electrical potential without an DC to AC conversion device positioned electrically between the source of DC electrical potential and cooking appliance. In some embodiments, the cooking appliance is contained in a housing and no DC to AC conversion devices are positioned electrically between the housing and the DC source.

In certain aspects the DC powered heating element is a DC powered induction heating element.

Other objects of the invention and its particular features and advantages will become more apparent from consideration of the following drawings and accompanying detailed description.

BRIEF DESCRIPTION OF THE DRAWINGS

FIGS. 1A and 1B are a functional diagrams showing a DC grill.

DETAILED DESCRIPTION OF THE INVENTION

Figure 1D:
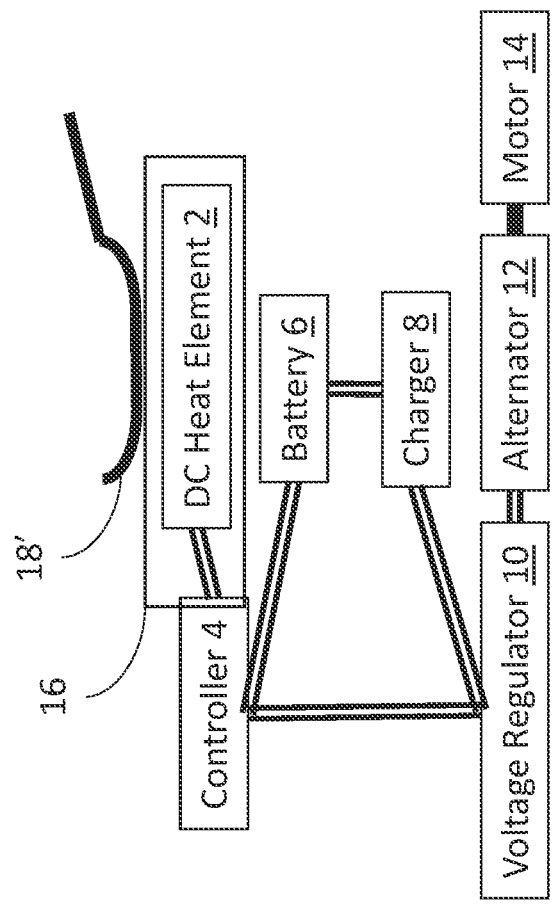
FIGS. 1C and 1D are functional diagrams showing a DC cooktop.

Referring now to the drawings, wherein like reference numerals designate corresponding structure throughout the views. The following examples are presented to further illustrate and explain the present invention and should not be taken as limiting in any regard.

FIGS. 1A-B show a DC powered grill. The cooking surface 18 in this case is a grill grate with a number of holes therein which allow matter to pass therethrough into a drip pan below. The housing 16 includes a cover/lid to close to retain more heat. The DC powered heat element 2. The grill grate 18 may be of the type disclosed in U.S. Pat. No. 10,349,776, the contents of which are incorporated by reference herein. As can be seen in each of FIGS. 1A-D, the DC heat element 2 is the only heat element for the cooking appliance and AC heat elements are excluded as are inverters to convert DC to AC to power the controller. It is contemplated that the Battery 6 may be charged by a charger 8 which may be connected to AC power. It is also contemplated that the charger 8 may convert AC power to DC to act as a power supply for the controller 4 and the DC heat element 2. In this manner when a vessel 100 (FIG. 2) is docked, it can be connected to shore power which is typically supplied as AC power. The same can hold true for use of the DC cooking appliance in other mobile units such as RVs, food trucks. It is further contemplated that an off grid home can have solar panels which supply electricity to the charger 8 which in turn charges the battery 6 while the controller 4 draws power from the battery 6 to power the DC heat element 2. In any case, the DC cooking appliance is powered by DC and thus removes the need for an inverter.

Preferably the DC heat element 2 accepts a DC power source, preferred power sources are 40 v or greater, more preferably a 48 v or greater, even more preferably 50 v or more, 60 v or more, 70 v or more, or even 100 v or more DC sources. However, it is contemplated that lower voltages of e.g. 12 v, 24 v or others may be useful. Particularly, the battery 6 may supply these voltages. The controller may be a simple manual knob control or a more complicated electronic display or capacitive touch sensitive control such as the one disclosed in U.S. Pat. No. 10,349,776. It is contemplated that the controller may operate on voltages less than the DC power source. For example, 6 v, 12 v or 24 v may be used to power the controller whereas the DC heat element 2 may use the higher voltage. This can be accomplished by a converter in the controller 4 which steps down the voltage as necessary. The controller 4 may also operate on the same voltage as the DC power source.

In FIGS. 1B and 1D shows the embodiment most typically relevant in the situation of a marine vessel, rv or other situation where a combustion motor 14 is available. Particularly, an alternator 12 is connected to the motor 14 by a drive shaft, gear or other device which transmits the rotation and torque of the motor to the alternator 12. This alternator is then connected to a voltage regulator 10 which ensures the required voltage is output in DC. This DC voltage may be supplied to a charger 8 which charges battery 6. The DC voltage from the regulator 10 may also directly connect to the cooking appliance via the controller 4. Thus, although the cooking appliance may use AC power to charge the battery, ultimately an inverter is not needed and the heat element 2 is DC powered and when AC power is not available, DC power may be supplied from the alternator 12 and/or battery 6.

Figure 1C:
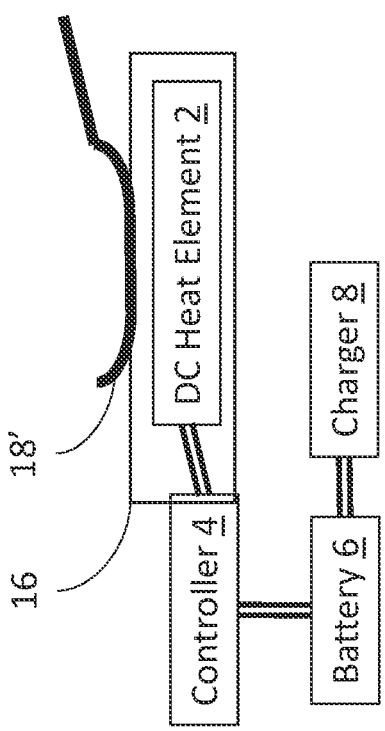

FIGS. 1C-D show an embodiment where the DC heat element 2 is a DC induction coil and a pan/cooking vessel 18' provides the cooking surface. The housing 16 may include a glass top support surface under the pan 18'. FIGS. 1A-B show an embodiment where the DC heat element 2 is a DC resistance heat element. The DC heat element 2 in preferred embodiments provides less than 1800 watts of heating, more preferably less than 1500 watts and even more preferably less than 1400 watts. The maximum current draw of the appliance is preferably less than 35 amps, more preferably less than 30 amps, even more preferably less than 25 amps and most preferably 20 amps or less. Higher than 1800 watts are contemplated, typically with higher DC voltages of 48 v or above as discussed herein. In certain cases 2000 watts or 2500 watts or more can be used with appropriate battery voltages while keeping current at reasonably low levels—below 60 amps.

Figure 2:
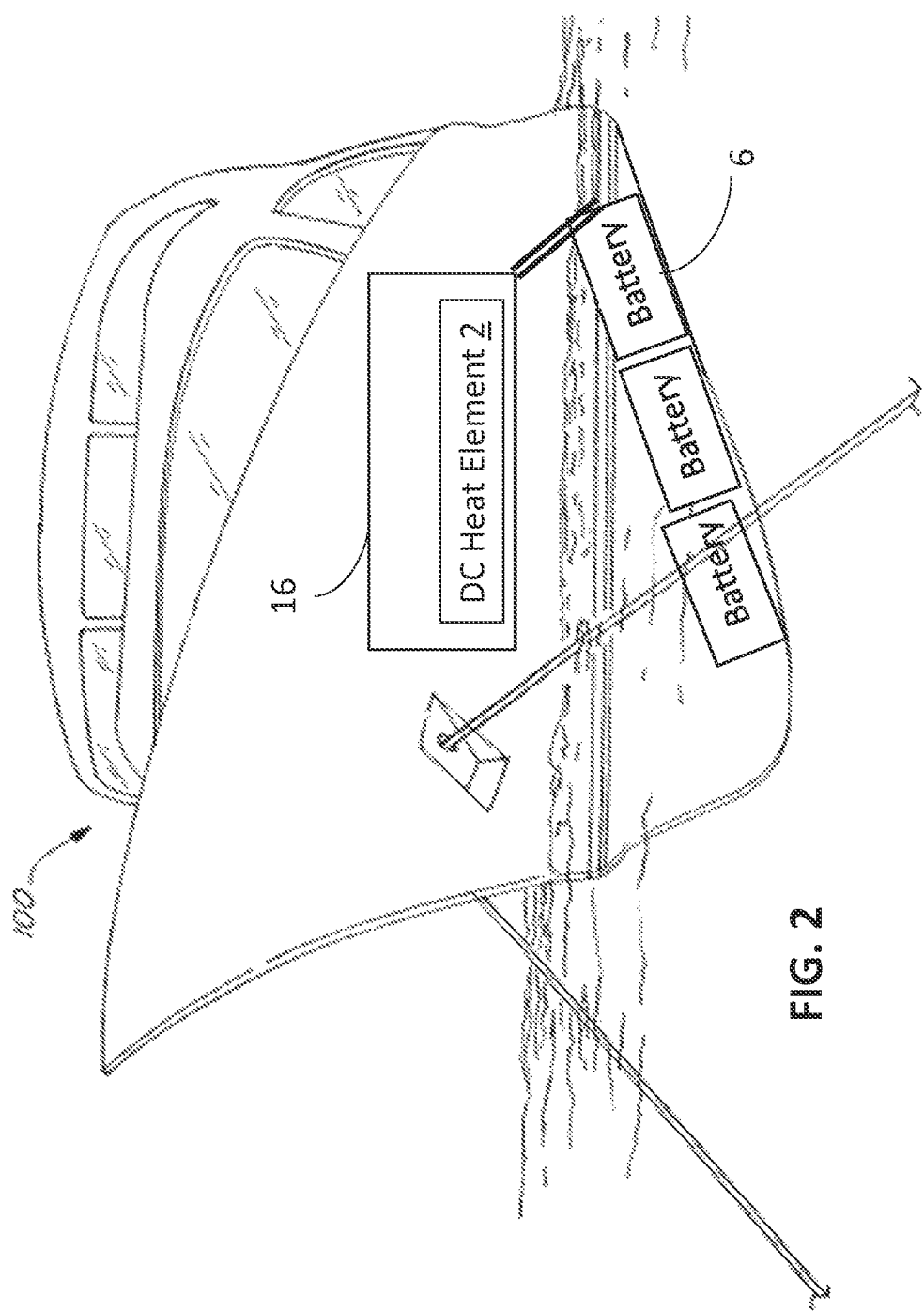
FIG. 2 shows the DC appliance of any of FIGS. 1A-D installed in a vessel.

FIG. 2 shows an example of the DC cooking appliance with the DC heat element 2 in its housing 16 which may be a grill housing, an induction cooktop housing, an oven housing and others. Preferably the grill/oven embodiments use resistance based heating coils. The battery bank 200 comprised of multiple batteries 6 may power other appliances on the vessel such as radar, control systems, lighting etc. It is further contemplated that an all electric vessel may be provided which uses battery power to propel the vessel 100. The cooking appliance may also be in an RV, van, off-grid home or other self-contained/self-powered unit which may be battery powered, a hybrid battery/combustion power or combustion powered. However, since the cooking appliance is DC powered, there is no need to convert from DC to AC with an inverter, rather the battery bank can power the cooking appliance or an alternator can power the cooking appliance.

Figure 3:
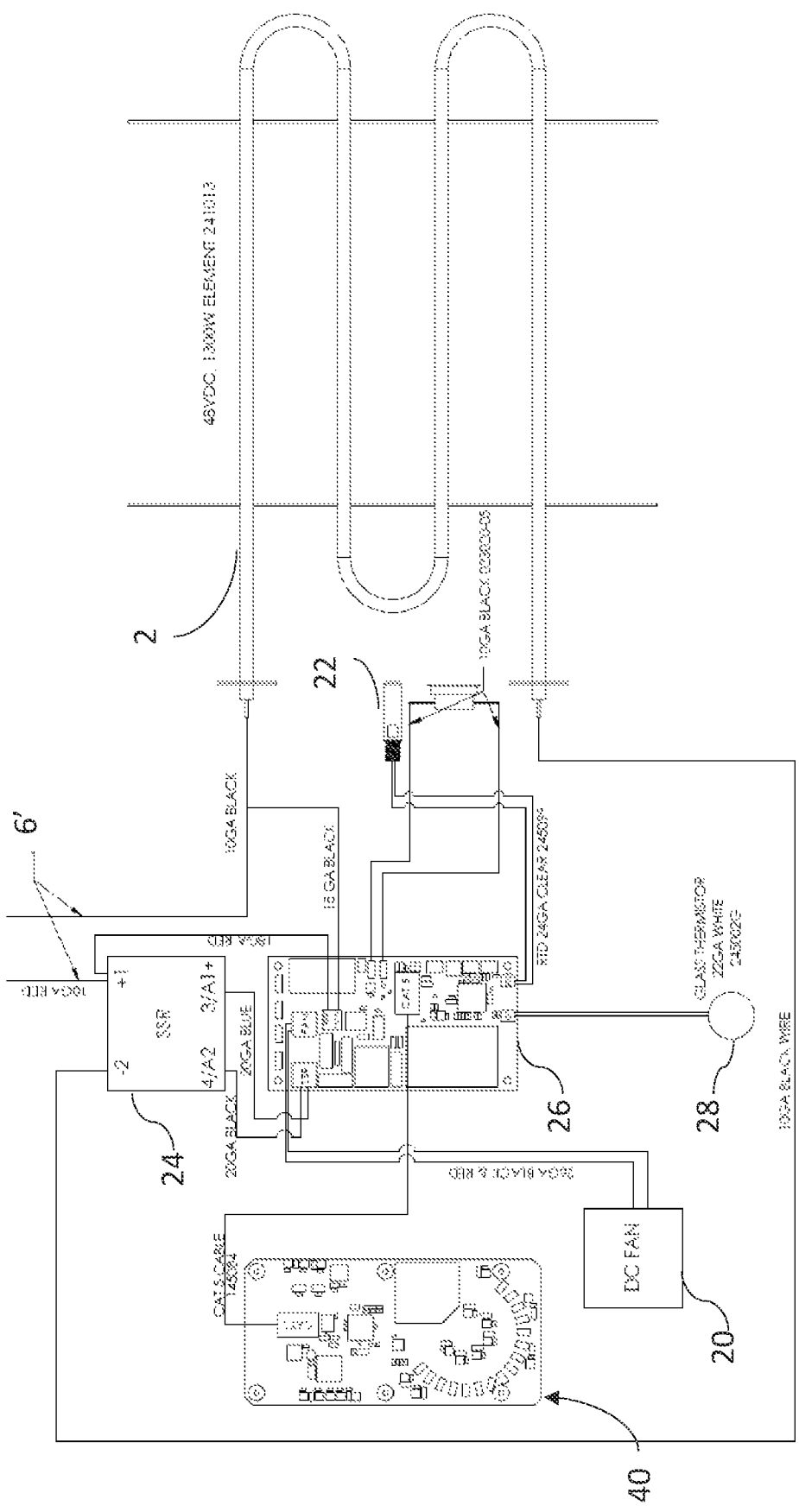
FIG. 3 shows an exemplary wiring diagram for a DC grill according to FIGS. 1A and B.

Although a battery is shown as the DC power source in FIGS. 1-2, other DC power sources are contemplated. FIG. 3 shows more details on the wiring of FIGS. 1A-B with a DC power source 6' which may be approximately e.g. 48 v. This may be from an alternator on a vessel/vehicle, a battery, solar, wind or other DC power sources. In preferred embodiments, the DC power source is not powered directly by combustion. A solid state relay 24 is provided and controlled by controller 4 and circuit board 26. The controller pad 40 as shown is connected via a CATS (e.g. ethernet) cable to the circuit board 26 to regulate the voltage output to the heat element 2 which is shown as a resistance based heating element. A DC fan 20 is also provided in order to cool the controller pad 40 and circuit board 26. In preferred embodiments the voltage of the controller pad 40 and circuit board 26 and DC fan 20 are all below 6 v, preferably 3 v or 5 v. It is also contemplated that other controller variations may be used and that controller 4 may be a more simple PWM (pulse width modulation) controller that uses a variable resistor to control the width of pulses. Thus, the controller may be selected from e.g. a number of conversion devices which modify average power output from a DC source. That output may be in the form of a square wave (all positive) or an alternating square wave with both positive and negative voltages output to the heating element, a smoothed DC output (e.g. a PWM using capacitor/resistor/induction devices to smooth the output) along with a variety of other conversion and control devices which can modify the DC input to the cooking appliance to control the power output to the heating element.

Figure 6:
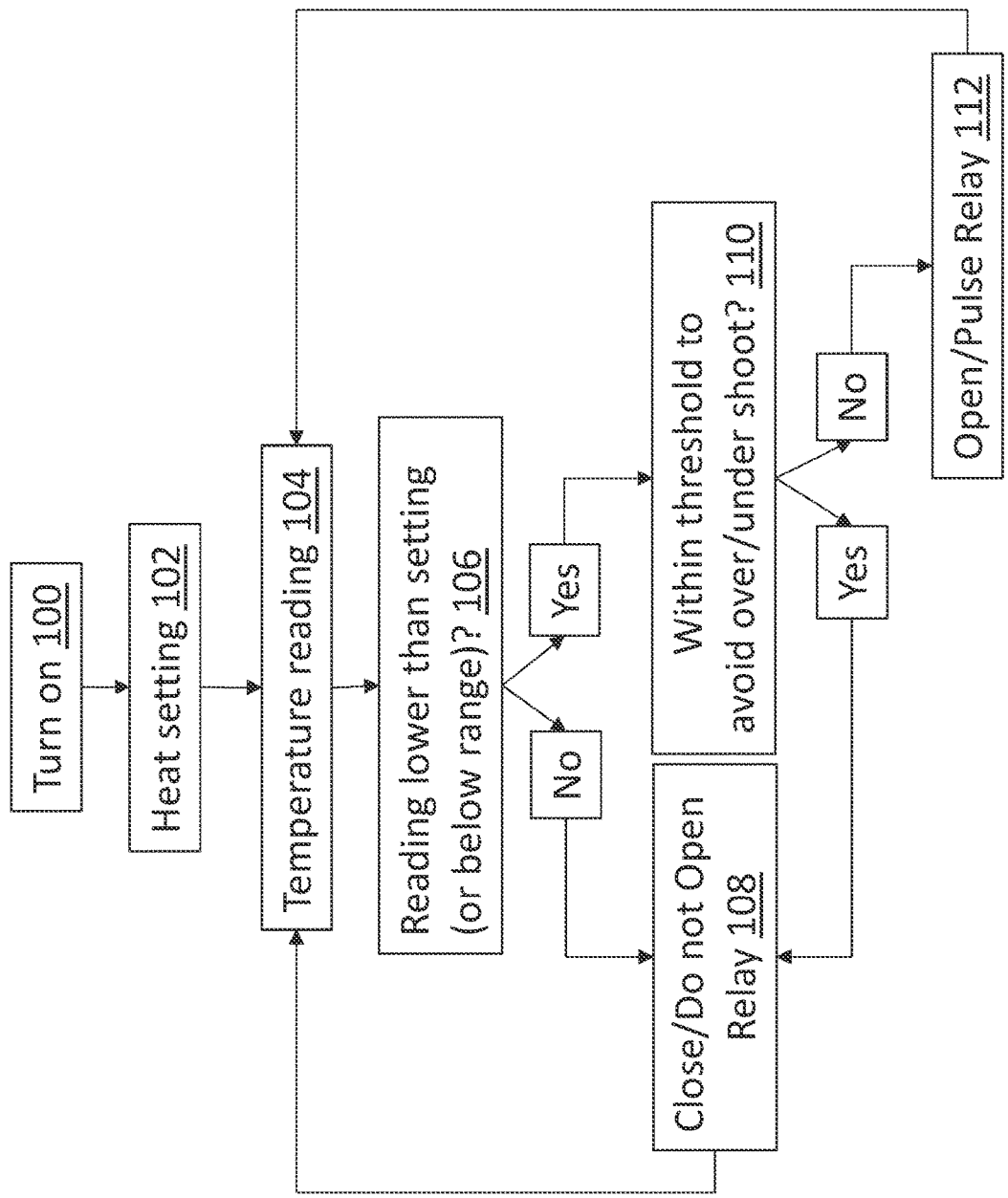
FIG. 6 shows an example control process implemented by the DC cooking appliance of the prior figures.

In certain embodiments as shown in FIG. 6, the controller 26 utilizes a feedback loop with the temperature sensor 28 to turn the relay on or off, depending if heat is needed or not. Although a solid state relay is shown, other types of contactors can be used to switch current/voltage on/off when needed.

When the keypad 40 instructs the controller 26 to turn on the cooking appliance 100, the solid state relay 24 will open and allow current to flow through the heating element. The embodiment of FIG. 3 shows a resistance heat element. The solid state relay is one example of a field effect transistor (FET) which can be used to turn on/off power to the heating element. It is understood that various other types of FET devices can be used as these are effective at switching on/off power at relatively high current values (e.g. above 15 A, above 20 A, above 25 A etc). In contrast, mechanical switches would require significant heat dissipation capabilities in order to switch the level of current of a DC battery/power source in the scenario of a cooking appliance and given the PWM controller and the frequency of switching, this may render mechanical switches unsuitable in DC cooking applications.

It is understood that a more simple dial system can be used in connection with PWM controller which uses a knob instead of a capacitive touch screen as found in the keypad 40. In either case, the amount of heat requested whether by turning a knob or by a signal from the keypad 40, will be indicative of a temperature. Thus, a heat setting of 7 out of 10 on a potentiometer would indicate a particular temperature. In certain embodiments, they keypad 40 can actually display a temperature and allow that temperature to be selected by the user. With this heat setting 102 in mind, a temperature reading 104 is taken. The controller 26 compares the setting to the reading. If the temperature is not lower than the setting, the relay closes (or remains closed) 108. If the reading is lower than the setting, the controller determines how close the reading is to the setting temperature. A threshold may be set as a percentage or degree differential or other, but this threshold is designed to take into account that when the heating element is turned off (relay closed), the temperature reading on the sensor 28 will continue to rise, thus the threshold is designed to avoid overshoot. Setting 102 may be indicative of a range, thus if the reading is outside the range, this would indicate the relay needs to open unless the difference is within the threshold 110. If the reading is too low or outside the range, specifically below the range, this would cause the relay to open 112 (or stay open). The solid state relay is in some embodiments important to the operation of a DC cooking appliance. Specifically, DC power of a cooking appliance will operate at a relatively high current compared to a similar sized AC appliance. As a result, a more simple potentiometer circuit may not be possible due to high current requirements. Instead, controlling a solid state relay to turn on or off depending on the temperature reading as compared to the setting is significantly more effective and efficient and also would not generally be desirable in AC cooking appliances such as grills and cooktops.

Furthermore, since a pulse width modulation (PWM) controller is used, it is understood that the solid state relay may pulse on/off frequently to in effect provide a lower average voltage to the heating element and thus less power. However, one key difference between AC and DC grills is that AC grill have the ability to switch a mechanical relay when the AC voltage is at or near zero, specifically the PWM controller of an AC grill will time the pulses with the zero point of the AC waveform. But, the solid state relay is provided in that the DC power source does not have these same oscillations that allow for taking advantage of zero voltage for switching. Thus, the SSR 24 will switch at non-zero voltages, typically voltages that are the same or close to input voltages, or at minimum 50% or more of input voltages. By switching at substantially non-zero voltage, this is different than switching of AC voltages which although very fast at e.g. 60 Hz, is not substantially instantaneous as the sinusoidal waveform of AC can be advantageously used to switch a mechanical relay on and off when the voltage is at substantially zero in the oscillation cycle. Thus, in the DC switching the voltage is immediately delivered as is a relatively high amount of current. Essentially, when the relay is opened to allow delivery of voltage, substantially the only restriction on the heat element receiving that 48 volts is the internal resistance of the wires and the speed at which electricity travels. In contrast, an AC relay switched at substantially zero voltage would not immediately cause voltage to be delivered to the heat element as the AC line in would need to climb in voltage according to the sin wave shape. The pulses controlled by the PWM controller provides a substantially square for voltage or square waveform voltage input whose width and period may vary depending on the heat required. The non-zero switching results in substantially immediate delivery of full voltage and associated current to the heat element. With a DC source, there is a substantially constant voltage delivered which means high current rates and challenging temperature considerations. This substantially constant voltage does contemplate minor variations that can occur upon initial startup for e.g a voltage regulator of an alternator to react to the call for voltage, but at the same time, the voltage does not drop to a substantially non-zero voltage to allow switching in accordance with a sin wave.

The solid state relay is able to handle these high current and voltage switching operations that AC grill controllers and their associated relays would not handle effectively. As stated earlier, AC controllers will take advantage of the zero or substantially zero periods of voltage to time the switching of a mechanical relay in order to have the switching occur at lower voltages and currents.

Figure 5:
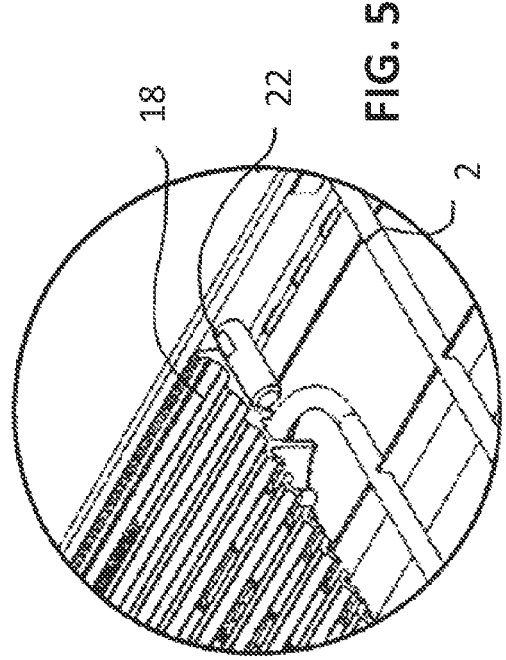
FIG. 5 shows a detail view of FIG. 4.
Figure 4:
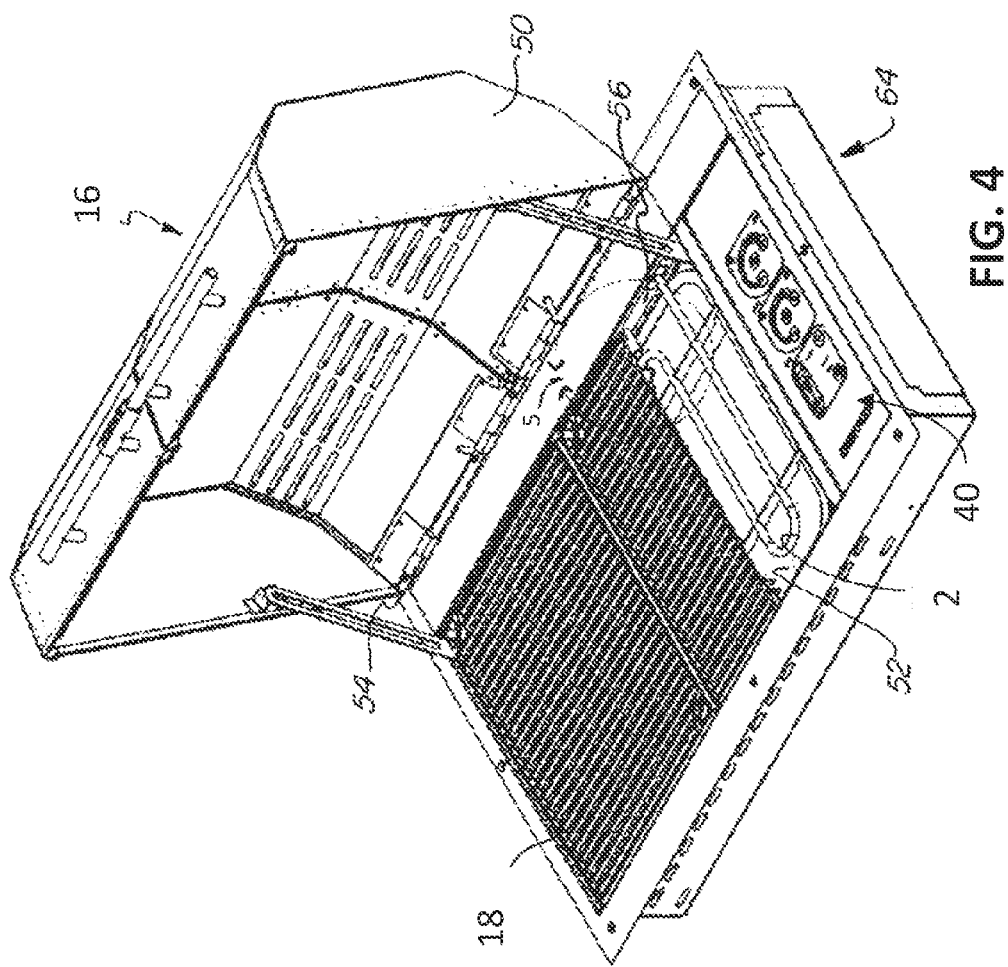
FIG. 4 shows a perspective partial cutaway view of the grill of FIGS. 1A and B.

In the DC scenario and as shown in FIG. 3, the controller (40/26) connects to the 4/A2 and 3/A1+ inputs on the solid state relay 24. This either provides or does not provide voltage to the relay. If voltage is provided, the relay is on and power is supplied to the heating element 2. If no voltage is provided to terminals 4/A2 and 3/A1+, the solid state relay remains off. The voltage delivered to terminals 4/A2 and 3/A1+ is typically around 5 v. Terminals −2 and +1 are those that are switched/connected by operation of the relay to either deliver or not deliver the incoming voltage 6' to the heat element 2. This switching logic is controlled based on inputs from the temperature sensor 22 which contacts the grill grate/griddle, typically the underside thereof or are otherwise in a position to measure temperature of the cooking appliance, typically positioned below the cooking surface and spaced away from holes e.g. a grill grate to avoid the temperature sensor becoming covered in grease/drippings. Temperature readings are used by the controller to determine when to turn on voltage to the heat element 2, specifically the circuit board 26 which receives control inputs from the keypad 40, which in connection with the temperature sensor 22, are used to control the temperature of the grill. In preferred embodiments, the sensor 22 is in contact with the grill grate in a location spaced from holes which allow matter to pass there through (such as grease) as shown in FIGS. 4 and 5, alternately, the sensor 22 can be below the grate but not in contact or otherwise infer temperature from something in contact with the grate or the element which includes the cooking surface. The glass temperature sensor 28 is used to turn the fan 20 on and off, this sensor 28 reads the temperature of the glass that the keypad 40 is part of and the fan 20 is used to ensure the controls are not too hot to touch and that they are also protected from heat damage.

It is understood that the voltages refer to industry standards in terms of how voltages are identified in that a 3 v does not necessarily operate on precisely 3.0 v as there is a known range in the industry of applicable voltages when a 3 v controller (or 5 v controller) is identified. For example 3 v is sometimes referred to as 3.3 v. The same applies to the DC power supply in general. For example, a 48 v supply may refer to a range or slightly different voltage due to battery chemistry or the configuration of the solar panel array such that the input is not precisely 48.0 v. These voltages are exemplary only and not limited.

Also connected to the circuit board is a temperature sensor (e.g. an Resistance Thermal Detector or RTD) which is in contact with the grill grate/griddle on the bottom thereof in order to measure the temperature thereof. That temperature may be used to regulate the heat output to the heat element 2 such that the user can set a temperature and the controller will maintain the cooking surface at that temperature based on the readings from the RTD. The control pad 40 and circuit board 26 operate as the controller 4 in order to allow for selection of heat settings and in order to regulate the DC output to the heating element 2. Often, the controller 4 will regulate the voltage output to the heating element 2 such that at e.g. the full 48 v, approximately 1300 w is produced whereas when the controller reduces the voltage coming out of the SSR 24 at the connector labeled −2, the wattage output will be lower.

Therefore, in certain embodiments, the controller and SSD can both provide a step down voltage to allow the controller to operate at lower voltages (e.g. 3 v or 5 v) and then allow the heating element to operate up to the voltage of the power supply. In preferred embodiments, the input voltage which can be applied to the heating element is at least 5 times that of the controller voltage, more preferably at least 6 times, at least 7 times or at least 8, 9 or 10 times or more the voltage.

Referring to FIGS. 4 and 5, the complete grill is shown with a partial cutaway of the grate 18 shown detail at FIG. 5. The grill housing 16 is provided with a lid 50 and a base housing 64. The lid is hinged 54 to allow for opening/closing and to retain heat. The RTD 22 extends from the opening 52 in the grill that receives the grate 18, specifically from the rear edge 56. The heating element 2 is also shown connected to the rear edge 56 which is part of the rectilinear opening of the grill that houses the grate 18 or griddle and heating element 2. The RTD 22 sits in a channel within the lower portion of the grate 18 to measure the grate temperature. The control pad 40 is provided to allow the user to regulate the heat in the two different zones shown. It is further contemplated that a single zone control pad may be provided and a single zone for the grill, thus making the grill smaller than what is shown in FIG. 4, essentially, having only one of the two zones shown in FIG. 4. A DC grill in a smaller size may be particularly useful for camping, boating, mounting in vehicles or other scenarios where portability and/or space savings are important. The DC grill may be powered by rechargeable battery packs similar to power tool batteries which can be easily released and recharged and re-used. It is also contemplated that the grill may be provided with a connector which can plug into commercially available portable battery banks, e.g. with a cigarette lighter style plug or through other user releasable connectors similar to how power tool batteries are connected to tools. These batteries may include e.g. 20 v or more, 24 v or more, 28 v or more, 36 v or more, 40 v or more, 48 v or more, 56 v or more, 60 v or more, 80 v or more. However, higher voltage batteries may be used in combination with a step down converter. For example, electric vehicles often have batteries with voltages of 300 v or more, e.g. 315 v, 375 v and higher. In situations where the cooking appliance is powered by one of these batteries, it may be beneficial to utilize a step down voltage converter to use lower voltages. Alternately, a higher voltage rated heating element may be used with a controller configured to control higher ranges of voltages and the voltage multiple of the maximum input for the heating element relative to the controller may be upwards of 50, 55, 60, 65, 70 or more. The control pad 40 and circuit board 26 will usually operate on lower voltages below 28 v, below 12 v or below 6 v (e.g. 3 v or 5 v). A shown in the wiring diagram, the incoming voltage of the power source 6' may be an input for the circuit board 26 as a reference voltage so that the controller 4 is able to determine what voltage it is starting with so that the correct step down can be implemented and so that the controller knows what the input voltage is so that power output can be controlled.

FIG. 6 shows that when the grill is turned on 100, a heat setting 102 is obtained. This heat setting 102 may be a specific temperature or may be indicative of a temperature based on a range setting, such as 1-10 on the control pad or low/medium/high or others. Once the user sets the control knob/control panel, the temperature reading 104 is used to determine if heat needs to be added. When the reading is not lower than the setting (or is not below the range) 106, the relay is closed or does not open 108. However, if the temperature reading is lower than the desired temperature based on the controller setting, the controller determines how far away from the desired temperature. For example, the controller may maintain the actual temperature within a range of +/−10 deg. F. relative to the desired temperature. If outside this threshold range (specifically below the range), the relay will open/pulse 112. The width of the pulses may be controlled based on how far away from the desired temperature the reading is. Particularly, when the appliance is first turned on, the temperature will read relatively cool in comparison to the desired temperature. At this point, the pulses will be wide or potentially the relay will simply be opened in order to reach the desired temperature as fast as possible. The temperature reading 104 acts as a feedback loop so that as the temperature increases, the relay can be pulsed open at narrower widths in order to avoid overshooting the desired temperature, then once the desired temperature is reached, the controller will cause the relay to pulse at relatively narrow widths. However, once cold food items to be cooked are placed on the grill, the temperature may begin to drop rapidly at which point the relay would be open entirely or open at wider pulse widths to quickly return to the desired temperature. In each case when the relay is opening/closing or pulsing, this is done at non-zero voltages, more particularly at the incoming line voltage 6' which is the DC voltage from e.g. a 48 v battery or other battery or DC power source.

In some preferred embodiments, the grill may be able to operate without being connected to a combustion powered unit, for example, in a vessel/car without the engine running and using only battery power but that the vessel/car may include an alternator/charger feature which charges the battery for the grill when not in use and then allows the grill to operate without the engine running and thus not creating a direct connection to active combustion power. In this manner, the grill can be used normally without running an engine or a generator, preferably by drawing from a battery, solar panel, wind generator or other similar DC power source which does not require active combustion, e.g. so that it can operate off grid and without a combustion generator.

In some embodiments, the grill may draw power directly from batteries in an electric vehicle or hybrid vehicle (which may include a vessel, car, van, RV, golf cart and the like) and the controller 4 may be further connected to the vehicle battery controller to prevent draining the vehicle battery with the grill unintentionally or by alerting the user via SMS or other electronic messaging or automatically shutting off the grill to avoid drawing down the battery which is used to move the vehicle.

As described herein, the cooking appliance excludes AC powered heating elements and further excludes combustion heating elements. For example, this would exclude gas, wood and charcoal burning capabilities, particularly excluding gas ignitors and nozzles along with the exclusion of various baskets and holders designed to hold burning/smoking wood/charcoal to heat the grill. Further, in some aspects there is no need for any rectifier or equivalent, particularly between the source voltage and the controller as the input is already DC. For example, rectifier circuits are characterized by a series of diodes which convert the normally sinusoidal AC wave which has positive and negative peaks to then only have either positive peaks or negative peaks. Next, a capacitor is provided to smooth these positive or negative peaks to be a consistent voltage (or more consistent voltage). This is but one type of rectifier circuits and equivalent circuits are known which can convert the sinusoidal AC wave to a constant (or more constant) DC output. This type of circuit is therefore not required in an electric DC grill whereas AC grills will typically be made with DC controllers and require a rectifier or equivalent. The DC appliance has the benefit of using the same type of power (DC in this instance) to both generate heat and to control that heat generation.

In some aspects, the controller herein may be a pulse width modulation (PWM) controller which is used to drive the solid state relay and the DC heating coil on the grill. The PWM controller is considered another type of step down voltage controller. However, it is understood that the actual voltage delivered during the "on" part of the pulses may be normal line or incoming battery/power supply voltage but by varying the width (time) of these pulses, the average voltage is lowered. In some cases, the output in pulses may be smoothed by a number of known circuits or circuit components, for example, use of capacitors is one option. Capacitors are often used in an AC to DC conversion in that the AC sin wave with negative and positive polarity is transformed by a bridge diode circuit to just be positive (or just negative) and then the valleys are smoothed out by a capacitor to deliver a more consistent DC voltage. The PWM controller may be controlled by a variable resistance knob or an integrated control in the driver circuit of the PWM controller. Thus, although a PWM controller may produce some alternation in that the voltage goes between 0 (between pulses) to the battery voltage during the pulses, this would not be considered Alternating Current. Instead, AC relates to voltage that changes polarity during its wave form cycle. However, the PWM controller would still preferably be powered by DC and may output an alternating voltage to the heating element as the heating element may be a resistor designed to dissipate heat whether DC (e.g. smooth, pulses or other forms) or pure AC (sin wave) or modified AC (e.g. alternating pulses). The PWM operates to reduce the average power distributed to the heating element by normally providing alternating pulses of power and no power to reduce the average voltage delivered to the heat element (and thereby reduce the average power). Current controllers can also be used to vary the power distributed to the heating element.

A at a maximum power setting of the controller, the cooking appliance generates heat sufficient to raise a temperature of the grill surface to 500 deg within 10 minutes with a grill lid closed and the cooking appliance positioned in a 70 deg F. environment. Furthermore, the cooking element, such as the grill grate, defines a cooking area in square inches and a wattage to area ratio is in the range 4.5-20 watts per square inch, more particularly 5-18 watts/square inches more even more particularly 6-15 watts per square inch. In some preferred embodiments, the heat element delivers a maximum wattage in the range of 800-2000 watts, particularly 1000-1800 watts, more particularly 1100-1500 watts. It is contemplated that the cooking appliance could have multiple zones with each zone having the disclosed wattage ranges, voltages, currents and wattage to area ratios described herein. For example, FIG. 4 shows a two zone grill. In the preferred embodiment, each grate is about 150-170 square inches, more particularly 155-165 square inches.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A cooking appliance configured to heat a cooking surface comprising:
   a housing;
   a controller, the controller comprising a keypad or dial for receiving a heat setting, the controller positioned in and connected to the housing with the keypad or dial accessible from an exterior of the housing;
   a direct current (DC) powered heating element positioned in the housing wherein the DC powered heating element includes an induction coil;
   wherein the cooking appliance is configured to connect to a source of DC electrical potential of at least 40 volts;
   wherein activation of the DC powered heating element by the controller is configured to heat the cooking surface according to the heat setting;
   wherein the cooking appliance excludes a combustion heating element and the cooking appliance is configured to be powered without a DC to alternating current (AC) conversion device positioned electrically between the source of DC electrical potential and the housing.

2. The cooking appliance of claim 1 wherein the controller is a pulse width modulation (PWM) controller.

3. The cooking appliance of claim 1 wherein the source of DC potential is a battery charged by a charger connected to an alternator.

4. The cooking appliance of claim 1 wherein the source of DC potential is at least 48 volts.

5. The cooking appliance of claim 1 further comprising a temperature sensor configured to read a temperature indicative of a cooking area temperature of the cooking appliance and the controller is configured to be set with a setting indicative of a desired temperature, wherein the controller compares the setting with the cooking area temperature read by the temperature sensor and adjusts power delivered to the induction heating element based on that comparison to maintain the desired temperature indicated by the setting.

6. The cooking appliance of claim 1 wherein the cooking appliance excludes an AC powered heating element.

7. A cooking appliance configured to heat a cooking surface comprising:
   a housing;
   a controller;
   a direct current (DC) powered induction heating element controlled by the controller;
   the controller and DC powered induction heating element positioned in and connected to the housing, the controller comprising a keypad or dial for receiving a heat setting, the keypad or dial accessible from an exterior of the housing;
   the cooking appliance configured to connect to a source of DC electrical potential having a voltage of at least 40 volts;
   wherein activation of the DC powered induction heating element by the controller is configured to heat the cooking surface according to the heat setting and the cooking appliance further excludes an AC to DC converter.

8. The cooking appliance of claim 7 wherein the cooking appliance excludes an alternating current (AC) powered heating element and excludes a combustion heating element.

9. The cooking appliance of claim 7 wherein a maximum wattage rating of the cooking appliance is in a range of 800-1800 watts.

10. The cooking appliance of claim 7 further comprising a temperature sensor which allows the controller to read a temperature of the cooking appliance and based on temperature readings from the temperature sensor as compared to a setting indicative of a desired temperature, the maintains the cooking appliance at the desired temperature.

11. The cooking appliance of claim 7 further comprising a temperature sensor in contact with a cooking element having the cooking surface thereon and the controller controls a temperature of the cooking surface based on readings from the temperature sensor.

12. The cooking appliance of claim 7 further comprising:
   a vehicle including the cooking appliance installed on or in the vehicle.

13. The cooking appliance of claim 12 wherein the vehicle is battery powered electric vehicle and the cooking appliance is connected to a battery of the vehicle.

14. The cooking appliance of claim 7 having a wattage rating of at least 800 W and 2000 W or less.

15. A cooking appliance configured to heat a cooking surface comprising:
   a controller the controller comprising a keypad or dial for receiving a heat setting;
   a direct current (DC) powered heating element electrically connected to the controller, the DC powered heating element includes an induction coil;
   a housing containing the DC powered heating element, the keypad or dial accessible from an exterior of the housing, and the cooking appliance is configured to connect to a source of DC electrical potential of least 40 volts.

16. The cooking appliance of claim 15 wherein the cooking appliance excludes an alternating current (AC) powered heating element and excludes a combustion heating element.

17. The cooking appliance of claim 15 wherein the cooking appliance excludes an inverter positioned electrically between the housing and the source of DC potential and the housing excludes an AC to DC converter.

18. The cooking appliance of claim 16 wherein the cooking appliance excludes an inverter positioned electrically between the housing and the source of DC potential and the housing excludes an AC to DC converter.

19. The cooking appliance of claim 15 further comprising a glass top which is configured to support a cooking element comprising the cooking surface and the DC powered induction heating element comprises an induction coil which is positioned below the glass top.

20. A cooking appliance configured to heat a cooking surface comprising:
   a controller;
   a direct current (DC) powered induction heating element electrically connected to the controller;
   a housing containing the controller and the DC powered induction heating element and the cooking appliance is configured to connect to a source of DC electrical potential of at least 40 volts.

21. The cooking appliance of claim 20 wherein the cooking appliance excludes an alternating current (AC) powered heating element and excludes a combustion heating element.

22. The cooking appliance 21 wherein the cooking appliance is connected to the source of DC electrical potential without an DC to AC conversion device positioned electrically between the source of DC electrical potential and cooking appliance.

23. The cooking appliance of claim 20 wherein the controller is selected from the group consisting of a manual knob and a touch sensitive control.

24. The cooking appliance of claim 20 wherein the controller is connected to a circuit board to regulate the voltage output to the DC powered induction heating element.

25. The cooking appliance of claim 20 wherein the controller outputs an alternating square wave to the induction heating element.

26. A cooking appliance configured to heat a cooking element having a cooking surface comprising:
- an induction cooktop housing including an induction heating element and a support configured to support the cooking element;
- a source of DC electrical potential connected to the induction cooktop housing, the source of DC electrical potential of at least 40 volts selected from the group consisting of: a battery power source, solar power source, wind power source and an alternator;
- a controller which is configured to activate the induction heating element to draw electrical potential from the source of DC electrical potential to thereby cause heat to be generated in the cooking surface by the induction heating element.

27. The cooking appliance of claim 26 wherein the cooking appliance excludes an alternating current (AC) powered heating element.

* * * * *